US012401495B1

(12) United States Patent
Shors et al.

(10) Patent No.: US 12,401,495 B1
(45) Date of Patent: Aug. 26, 2025

(54) UNIVERSAL CIRCUIT DEVICE FOR SELECTIVE BLOCK CIPHER CRYPTOGRAPHIC PROCESSING WITH SPACE EFFICIENT CONFIGURATIONAL AGILITY

(71) Applicant: The Government of the United States as represented by the Director, National Security Agency, Ft. George G. Meade, MD (US)

(72) Inventors: Douglas J. Shors, Towson, MD (US); Stefan G. Treatman-Clark, Edgewater, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 273 days.

(21) Appl. No.: 18/225,450

(22) Filed: Jul. 24, 2023

(51) Int. Cl.
*H04L 9/06* (2006.01)
*H04L 9/08* (2006.01)

(52) U.S. Cl.
CPC .......... *H04L 9/0618* (2013.01); *H04L 9/0891* (2013.01)

(58) Field of Classification Search
CPC .................... H04L 9/0618; H04L 9/0891
See application file for complete search history.

(56) References Cited

U.S. PATENT DOCUMENTS

| | | | | |
|---|---|---|---|---|
| 7,451,288 | B2 * | 11/2008 | Goettfert | G06F 12/1408 |
| | | | | 711/216 |
| 8,351,599 | B2 * | 1/2013 | Yoon | H04L 9/0618 |
| | | | | 380/37 |
| 9,160,525 | B2 * | 10/2015 | Millendorf | H04L 9/0637 |
| 11,515,998 | B2 * | 11/2022 | Ikarashi | G09C 1/00 |
| 11,755,567 | B1 * | 9/2023 | Jing | H04L 9/3247 |
| | | | | 713/176 |
| 2002/0021802 | A1 * | 2/2002 | Muratani | H04L 9/002 |
| | | | | 380/37 |
| 2010/0091991 | A1 * | 4/2010 | Shibutani | G09C 1/00 |
| | | | | 380/37 |
| 2010/0115286 | A1 * | 5/2010 | Hawkes | G06F 12/1408 |
| | | | | 713/189 |
| 2015/0039904 | A1 * | 2/2015 | Matsuda | H04L 9/0618 |
| | | | | 713/189 |

(Continued)

Primary Examiner — J. Brant Murphy

(57) ABSTRACT

A universal circuit device provides for configuration responsive to predetermined configuration data to selectively establish a plurality of disparate block cipher cryptographic processing circuits. A main key processing unit generates a plurality of round keys responsive to the configuration data. A main block processing unit includes block input and output storage units respectively defining predetermined numbers of segments, and a basic data portion forming a plurality of operational channels extending between corresponding segments of the storage units. The basic data portion is partially preconfigured to have coupled to certain operational channels a nonlinear map (F) stage which applies nonlinear conversion on data received from a storage unit segment, a linear map (L) stage which linearly transfers data between selected storage unit segments and operational channels, and a round key (K) stage which applies a round key generated by the main key processing unit to data in the second operational channel.

20 Claims, 5 Drawing Sheets

(56) References Cited

U.S. PATENT DOCUMENTS

| | | | | |
|---|---|---|---|---|
| 2016/0062919 | A1* | 3/2016 | Hars | G06F 12/1408 |
| | | | | 713/189 |
| 2016/0269175 | A1* | 9/2016 | Cammarota | H04L 9/002 |
| 2017/0302438 | A1* | 10/2017 | Yang | G06F 13/4282 |
| 2018/0176011 | A1* | 6/2018 | Hars | H04L 9/0861 |
| 2023/0074229 | A1* | 3/2023 | Jia | G06F 15/7821 |

* cited by examiner

UNIVERSAL CIRCUIT DEVICE FOR SELECTIVE BLOCK CIPHER CRYPTOGRAPHIC PROCESSING WITH SPACE EFFICIENT CONFIGURATIONAL AGILITY

FIELD OF THE INVENTION

The present invention is generally directed to a universal circuit (UC) device for carrying out encryption and/or decryption of data using one or more selected types of block cipher cryptographic techniques. More specifically, the present invention is directed to a UC device which makes available a wide range of different block cipher processing circuits that it may be selectively configured to implement. The UC device is provided in such manner that its hardware circuit elements may be configured as needed in software by suitably applying a predetermined set of configuration data, to carry out any of a plurality of block cipher cryptographic processing techniques known in the art for encryption and/or decryption of data. The UC device provides highly versatile configurational agility and space efficient structure for carrying out one or more particularly selected types of block cipher encryption and/or decryption.

BACKGROUND OF THE INVENTION

Programmably configurable circuit devices such as field programmable gate arrays (FPGA's) and application specific integrated circuits (ASIC's) are known in the art. Such known configurable circuit devices are not without characteristic drawbacks that limit their availability for applications requiring both space efficiency and configurational agility. The space efficiency required for certain applications may for instance necessitate such features as a high degree of throughput per unit area. The configurational agility required for certain applications may necessitate not only a wide range of configurational flexibility but also simple and efficient configurability which necessitates, for instance, minimal loads of configuration bits for full configuration or reconfiguration.

In the case of FPGA's, the devices heretofore known do offer expansive flexibility. But this degree of flexibility comes at the cost of space efficiency. It is not uncommon for FPGA's to be equipped with hardware elements numbering on the order of billions of gates, a substantial portion of which typically remain unused after field programming. Consequently, the throughput per unit area tends to be quite low for FPGA's.

That is not so in the case of ASIC's, which are by definition tailored quite specifically for a particular custom implementation. As such, their space efficiency in terms of throughput per unit area is characteristically quite high. But this degree of space efficiency comes at the cost of little or no substantial flexibility due to their application specific integration.

Because ASIC's come with a custom implementation substantially in place already, they may be subject to a notable vulnerability for more sensitive applications like encryption/decryption processing. The specific integration of hardware circuit elements may unduly expose proprietary details about the custom implementation. This may potentially compromise the sensitive application.

Hence, there is need for a configurable circuit device which overcomes the drawbacks of such devices heretofore known in the art. There is need for a configurable circuit device that may be adapted in a highly versatile manner to carry out any of a plurality of block cipher cryptographic processing techniques known in the art for encryption and/or decryption of data. There is need for such a circuit device whose hardware circuit elements may be configured as needed in software responsive to a predetermined set of configuration data. There is need for such a circuit device that is simple and efficient in structure, yet provides highly versatile configurability with minimal burden in terms of the required load of configuration data therefor. There is need, moreover, for such circuit device which prior to configuration does not compromise identifying details of the particular encryption/decryption to be implemented.

SUMMARY OF THE INVENTION

It is an object of the present invention to provide a configurable circuit device that may be adapted in highly versatile manner to carry out any of a plurality of block cipher cryptographic processing techniques.

It is another object of the present invention to provide a configurable circuit device having hardware circuit elements that may be configured as needed in software responsive to a predetermined set of configuration data.

It is yet another object of the present invention to provide a configurable circuit device that is simple and efficient in structure, yet provides highly versatile configurability with minimal burden in terms of the required load of configuration data therefor.

It is still another object of the present invention to provide a configurable circuit device configurable to carry out a plurality of block cipher cryptographic processing techniques, which prior to configuration does not compromise identifying details of the particular processing technique to be implemented These and other objects are attained by a universal circuit device provided in accordance with certain embodiments of the present invention which is configurable responsive to predetermined configuration data to selectively establish a plurality of disparate block cipher cryptographic processing circuits. The device comprises at least one main key processing unit generating a plurality of round keys responsive to the configuration data, and at least one main block processing unit coupled to the main key processing unit. The main block processing unit includes block input and output storage units respectively defining predetermined numbers of segments, and a basic data portion forming a plurality of operational channels extending between corresponding segments of the block input and output storage units. The basic data portion includes a nonlinear map (F) stage disposed in at least a first of the operational channels, with the F stage having a bypass stage coupled in parallel thereto. The F and bypass stages are selectively coupled in mutually exclusive manner responsive to the configuration data to pass output data along the first operational channel. The F stage executes a preselected nonlinear conversion on input data received from a segment of the block input storage unit. The basic data portion further includes a linear map (L) stage operably coupled responsive to the configuration data to linearly transfer input data received from one selected segment of the block input storage unit to one or more selected operational channels. The basic data portion includes as well a round key (K) stage disposed in at least a second of the operational channels, where the K stage applies to data in the second operational channel one of the round keys generated by the main key processing unit. The data processed through each of the operational channels is stored in a corresponding segment of the block output storage unit.

In accordance with certain other embodiments, a universal circuit device selectively configurable to establish and interconnect hardware elements thereof responsive to predetermined configuration data is provided to execute a plurality of types of block cipher cryptographic processing with space efficient configurational agility. The device comprises at least one main key processing unit generating responsive to the configuration data a plurality of round keys and a plurality of round pre-keys, the round keys being generated based on a preselected cryptovariable. The device also comprises at least one main block processing unit coupled to the main key processing unit and defined by a partial preconfiguration of the hardware elements. The main block processing unit includes block input and output storage units respectively defining predetermined numbers of segments, and a basic data portion forming a plurality of operational channels extending between corresponding segments of the block input and output storage units. The basic data portion includes a nonlinear map (F) stage disposed in at least a first of the operational channels, with the F stage having a bypass stage coupled in parallel thereto. The F and bypass stages are selectively coupled in mutually exclusive manner responsive to the configuration data to pass output data along the first operational channel, with the F stage executing a preselected nonlinear conversion on input data received from a segment of the block input storage unit. The basic data portion also includes a linear map (L) stage operably coupled responsive to the configuration data to linearly transfer input data received from one selected segment of the block input storage unit to for bitwise addition at one or more selected operational channels. The basic data portion further includes a round key (K) stage disposed in at least a second of the operational channels, the K stage bitwise adding to data in the second operational channel one of the round keys generated by the main key processing unit. The data processed through each of the operational channels is stored in a corresponding segment of the block output storage unit.

In accordance with certain additional embodiments, a universal circuit device selectively configurable responsive to predetermined configuration data is provided to execute a plurality of types of block cipher cryptographic processing with space efficient structure and configurational agility. The device comprises at least one main key processing unit generating responsive to the configuration data a plurality of round keys from a main key, and at least one main block processing unit coupled to the main key processing unit. The main block processing unit includes an intermediate input storage unit defining a predetermined number of segments; an intermediate output storage unit defining a predetermined number of segments; and, a basic data portion forming a plurality of operational channels extending between corresponding segments of the intermediate input and output storage units. The basic data portion includes a nonlinear map (F) stage disposed in at least a first of the operational channels, the F stage having a bypass stage coupled in parallel thereto. The F and bypass stages are selectively coupled in mutually exclusive manner responsive to the configuration data to pass output data along the first operational channel, where the F stage executes a preselected nonlinear conversion on input data received from a segment of the intermediate input storage unit. The basic data portion also includes a linear map (L) stage operably coupled responsive to the configuration data to linearly transfer input data received from one selected segment of the intermediate input storage unit for bitwise addition at one or more selected operational channels. The basic data portion further includes a round key (K) stage disposed in at least a second of the operational channels, the round key stage bitwise adding to input data received thereby one of the round keys generated by the main key processing unit. The data processed through each of the operational channels is stored in a corresponding segment of the intermediate output storage unit.

BRIEF DESCRIPTION OF THE DRAWINGS

Various aspects of the present invention, as well as the structural and operational features of certain exemplary embodiments disclosed herein, may be better understood by reference to the following description, taken in connection with the accompanying drawings, wherein like reference numerals and characters identify like elements, in which.

DETAILED DESCRIPTION OF THE PREFERRED EMBODIMENTS

Figure 1:
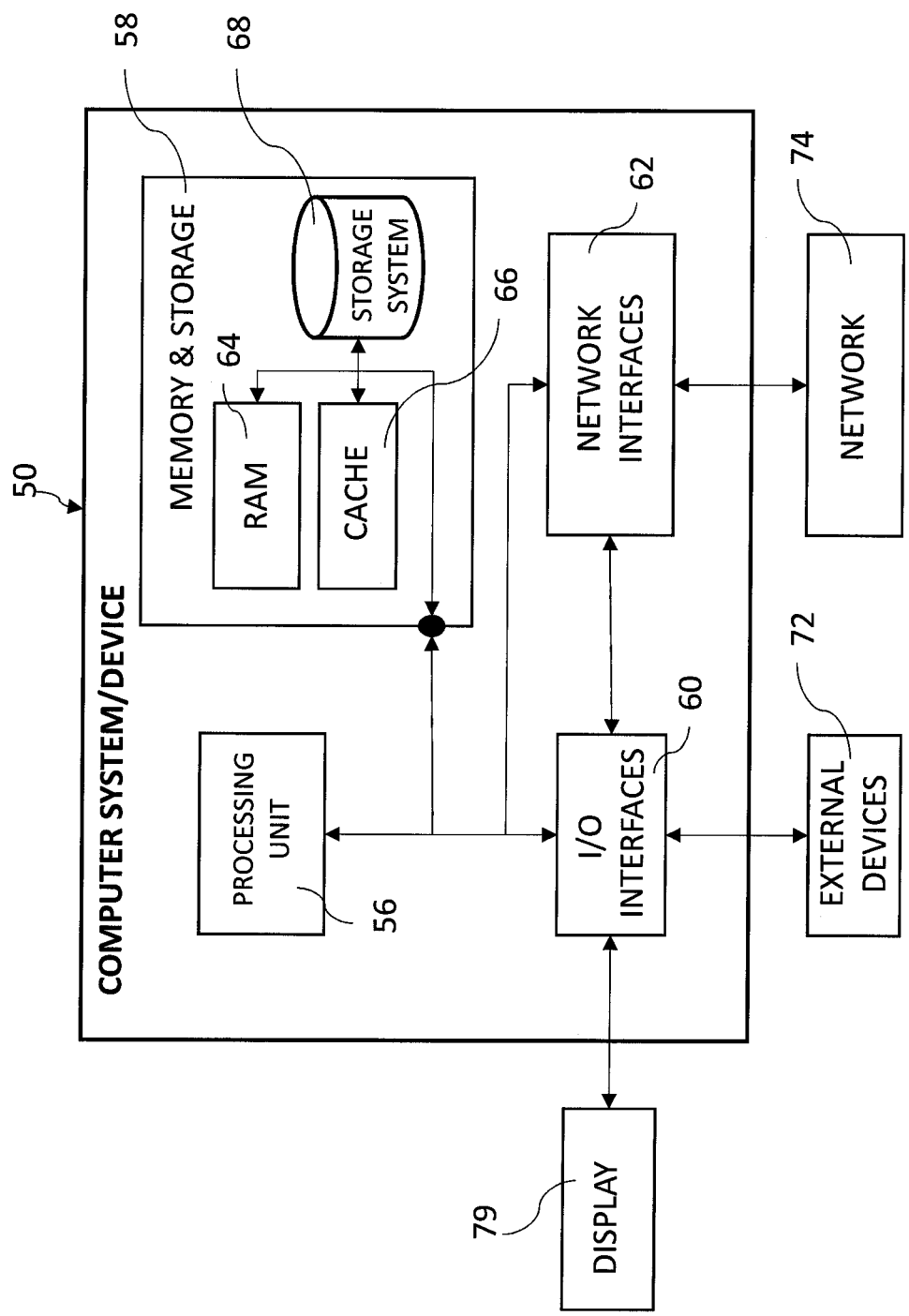
FIG. 1 is a schematic diagram illustrating an example of the general architecture typical of processing devices employed in various computer controlled equipment known in the art.

While the present invention may be embodied in various forms suitable for particular applications, there are shown in the accompanying drawings and described in illustrative detail herein specific embodiments which exemplify the principles of the invention as implemented for certain illustrative applications. It is to be understood that this collective disclosure is meant to be illustrative and exemplary, and is not intended to limit the invention to what is illustrated and described herein.

An example of a universal circuit device implemented in accordance with an exemplary embodiment of the present invention is disclosed herein. The universal circuit device, while referred to in the singular in the interests of brevity and simplicity of description, may actually be formed in one or more separately packaged portions that collectively form the "device" in any suitable manner known in the art, depending on the requirements of the particularly intended application.

Briefly, the subject universal circuit (UC) device provides for selective configuration and highly versatile use to carry out any one of a plurality of block cipher cryptographic processing techniques known in the art for encryption of data to be transmitted and/or decryption of data that is received. The UC device thus makes available for programmable implementation a wide range of different block cipher processing circuits that it may be selectively configured to implement. The UC device generally includes suitable hardware elements known in the art to provide a field programmable device having an array of configurable portions, such as logic gate, interconnect, and/or input interface circuit portions. In certain embodiments and applications, the UC device suitably includes as well such hardware elements as memory, transceiver, and/or processor circuit portions. Depending on the configuration data—that is, the values/contents of the corresponding configuration bits applied to and for the various circuit portions of the UC device—the circuit portions are accordingly established and interconnected to execute the desired block cipher encryption or decryption.

In accordance with certain aspects of the present invention, the subject UC device is partially preconfigured in hardware to universally support a preselected range, class, or other grouping of possible block cipher cryptographic processing circuit implementations by which to encrypt or decrypt a given block of payload data. Accordingly, the UC device is partially preconfigured to provide circuitry to implement many operations that are common to a variety of block cipher algorithms (or to predefine the scope of universality). The partial preconfiguration in hardware aids in alleviating the amount of configuration data needed to fully realize a particularly desired and selected cryptographic processing circuit implementation. In addition to minimizing the load of configuration data required for highly versatile configurability, the partial preconfiguration also obviates the need for the undue redundancy of unused hardware elements otherwise required for highly versatile configurability. This affords simplicity and efficiency in structure for the UC device.

In accordance with certain other aspects of the present invention, the subject UC device's partial preconfiguration is sufficiently generic to the given range, class, or grouping of available circuit implementations for block cipher cryptographic processing that the would-be configuration of the circuit implementation particularly selected therefrom remains safely obscured. That is, the identifying details of the particular block cipher cryptographic processing circuit to be implemented are not compromised by a bare UC device prior to its software-driven configuration in accordance with the corresponding configuration bits. Hence, the security of encryption/decryption to be implemented is not compromised by the bare UC device.

In various embodiments and applications, including the AES-256 block cipher and other symmetric key algorithms for example, a suitably configured UC device is operable to provide high-throughput pipelined implementations of bit-, nibble- and byte-oriented codebooks. As such, the UC device provides an implementation platform for block cipher processing of data which offers an optimal combination of throughput per unit area and range of configurational flexibility.

In certain embodiments and applications, overall throughput may be further enhanced by use of pipelining, thought it would come at the cost of the device's chip area. If the pipeline is made sufficiently deep, a fully unrolled version of the given block cipher cryptographic processing may be implemented. Each time the pipeline fills, one result per clock cycle is obtained. This provides optimal algorithm agility; because each stage of the pipeline may be configured independently in real time, each stage of the pipeline may be operated to compute a round of a distinct algorithm.

The UC device provides the circuitry hardware sufficient to alternatively implement selected ones of such block cipher cryptographic processing techniques as required for the particularly intended application by configuring the circuitry according to a corresponding set of predetermined configuration data, generally denoted herein "configuration bits." The UC device includes in its circuitry hardware the various gates, interconnecting conductive paths, storage, and other components established in any suitable manner known in the art for programmable interconnection to implement the processing units disclosed herein responsive to the configuration bits, without substantial alteration of the hardware. The processing units are thereby selectively configured to collectively define different ones of a user-selected block cipher cryptographic circuit according to the particular set of configuration bits applied thereto. The required throughput is adaptively satisfied by configuring such processing units to execute iteratively as needed.

The UC device's circuitry hardware generally includes at least one main block processing unit operably coupled to at least one main key processing unit. A configuration controller unit may be coupled to or integrated into the UC device's circuitry hardware to suitably apply configuration data, preferably in the form of one or more sets of configuration bits that are read into the device, as required for the given application. In certain applications, the configuration controller unit suitably applies the various configuration bits to define different block cipher cryptographic circuits to execute encryption/decryption on various pipelined segments of payload data.

The main block processing unit executes to carry out one or more rounds of the given block cipher encryption or decryption operation upon a block of payload data. The main key processing unit executes in coordination with the main block processing unit to provide the necessary key data required for proper operation of that main block processing unit. In certain embodiments, the given block cipher operation is of symmetric-key type, where encryption and decryption carried out thereby are based on the same cryptographic key.

The subject UC device preferably affords sufficient selectivity for a high degree of configurational agility—hence cryptographic agility—in use. That is, the same UC device may be programmably driven responsive to various sets of configuration bits to rapidly change the block cipher cryptographic processing that it carries out on the incoming payload data. This in turn affords a high degree of performance and algorithmic agility that enables the UC device in certain applications to execute multiple block cipher cryptographic techniques in rapid succession (time-shared manner) on different stages of pipelined data for encryption/decryption using those techniques in seemingly concurrent manner.

Such pipelining is done for the sake of throughput, and at the cost of device chip area. If the pipeline is made sufficiently deep, fully unrolled versions of block cipher operations may be implemented to obtain one full result each clock cycle as the pipeline fills during that clock cycle. Such operation provides optimal algorithmic agility: with each stage of the pipeline configured independently in real time, each stage of the pipeline may compute a round of a distinct block cipher operation.

Block cipher cryptographic techniques that may be carried out include for example the Advanced Encryption Standard (AES) or any other suitable technique known in the art for key-based encryption of data in blocks of predetermined size. Such block cipher encryption techniques conceptually organize the data to be encrypted/decrypted (or payload data) into symmetrically arrayed segments-such as to form "blocks" of 16 bytes arranged along four rows and four columns, with each of the bytes within the resulting 4×4 block of bytes being formed by 8 bits.

The UC device is configured, controlled, and actuated in a computer processing environment. By way of background, a computer program which is executed by a microprocessor (or generally, "processor") based computer processing system is normally generated as source code, or a human-readable listing of instructions for the processor to carry out a certain process. The source code is compiled to corresponding object code that is represented in a machine language form readable to the particular type of CPU (central processing unit) employed by the processor. In some instances, the machine language (such as with Assembly/Assembler language) may employ certain notation or mnemonics so as to be in human readable form as well. The object code may be executable as is in some applications. But in many applications the object code must also be linked/paired by a suitably configured linker to one or more libraries of other object code files in order to be fully executable. The resulting executable code, or binary, is then available for execution by the processor to carry out the corresponding process.

Computer Processing Device/Architecture Example

Executable code of a process may be accessed, temporarily loaded onto volatile memory, and run accordingly over one or more run sessions by a computer processing device 50 of any suitable type known in the art. FIG. 1 schematically illustrates an example of the general architecture typical of processing devices at the core of various computer controlled equipment known in the art. The computer processing device 50 is shown in general form with certain basic operational components operably coupled by system buses, interconnects, or other suitable communication links known in the art. The components generally include one or more central processing units (CPU's) 56, memory and storage units 58, input/output (I/O) interfaces 60, and network or other communication interfaces 62.

The memory and storage unit 58 includes volatile storage 64 typically in the form of random access memory (RAM) or the like operably coupled for access by a CPU 56. The memory and storage unit 58 may also include additional volatile storage in the form of cache or other such auxiliary memory for higher speed retrieval of certain data. Such volatile storage is also referred to in connection with the particular embodiments disclosed herein generally as "volatile memory," or as "running memory" while serving to temporarily store the executable instructions and data required for a process during its execution. Volatile storage may be represented in certain cases (as in the embodiment illustrated herein) through a "virtual memory" whose address space maps to physical memory in any manner known in the art suitable for the given application. The memory and storage unit 58 may further include a nonvolatile storage system 68 in the form of solid state, magnetic/optical hard drive, or other such media for long term storage of data.

The CPU 56 communicates through the I/O interfaces 60 with respective external devices 72 such as such as keyboards, mouse, and other peripherals. The CPU 56 communicates through the network interfaces 62 with one or more networks 74 to which the computer processing device 50 may be operably coupled, such as Internet Protocol (IP) networks. A display and/or other user interface may be coupled through the I/O interface units for user interaction with the computer processing device 50.

Among other things, the computer processing device 50 may be employed in specialized computing devices such as embedded controllers, supervisory control and data access (SCADA) systems, and industrial control systems (ICS). The general architecture illustrated may be adapted by adding or deleting certain units or components to suit the needs of a particular embodiment and its intended application.

Main Block/Key Processing Units as Partially Preconfigured

Figure 2:
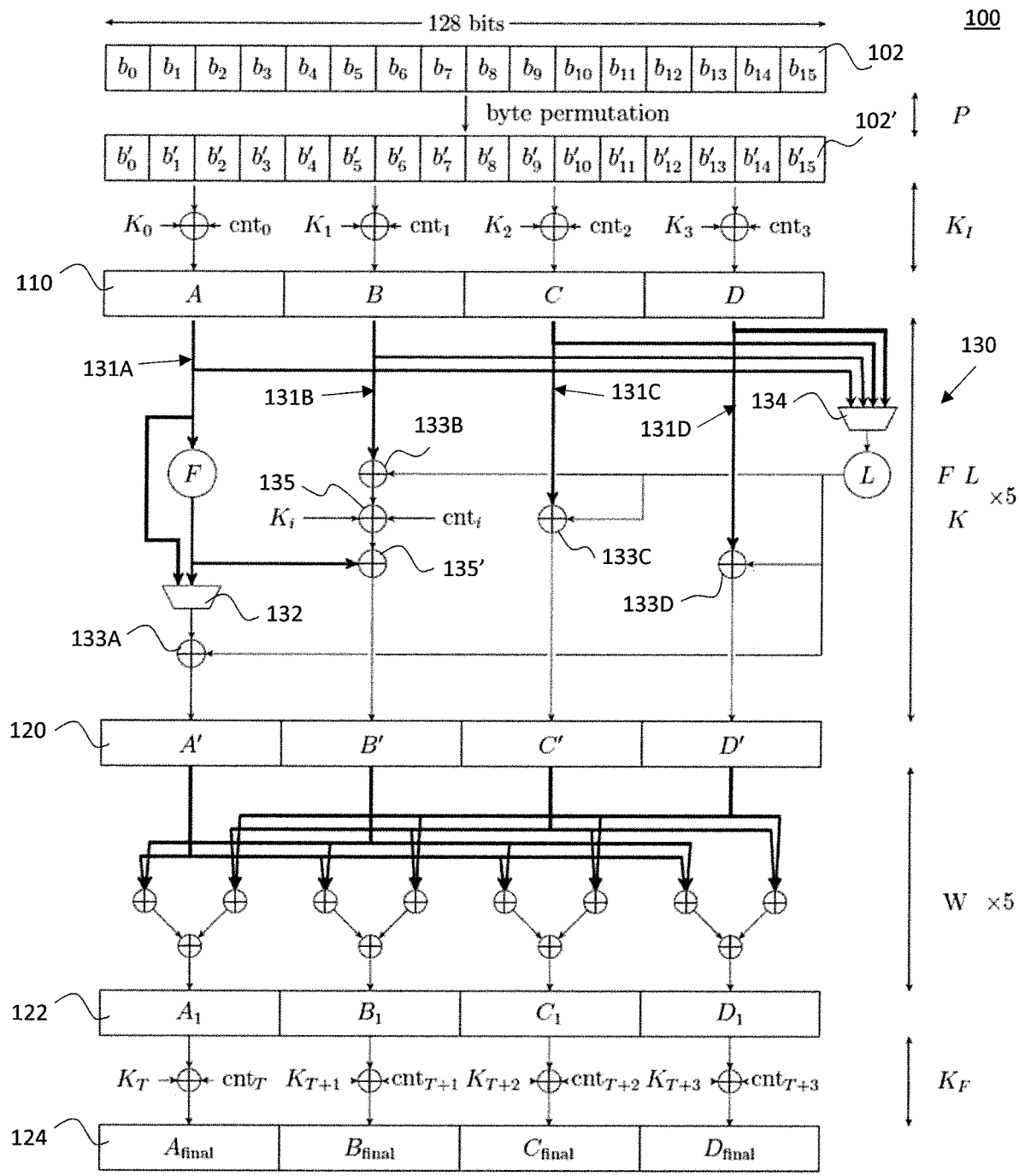
FIG. 2 is a block diagram schematically illustrating a main block processing unit in a universal devices formed in accordance with one exemplary embodiment of the present invention.
Figure 3:
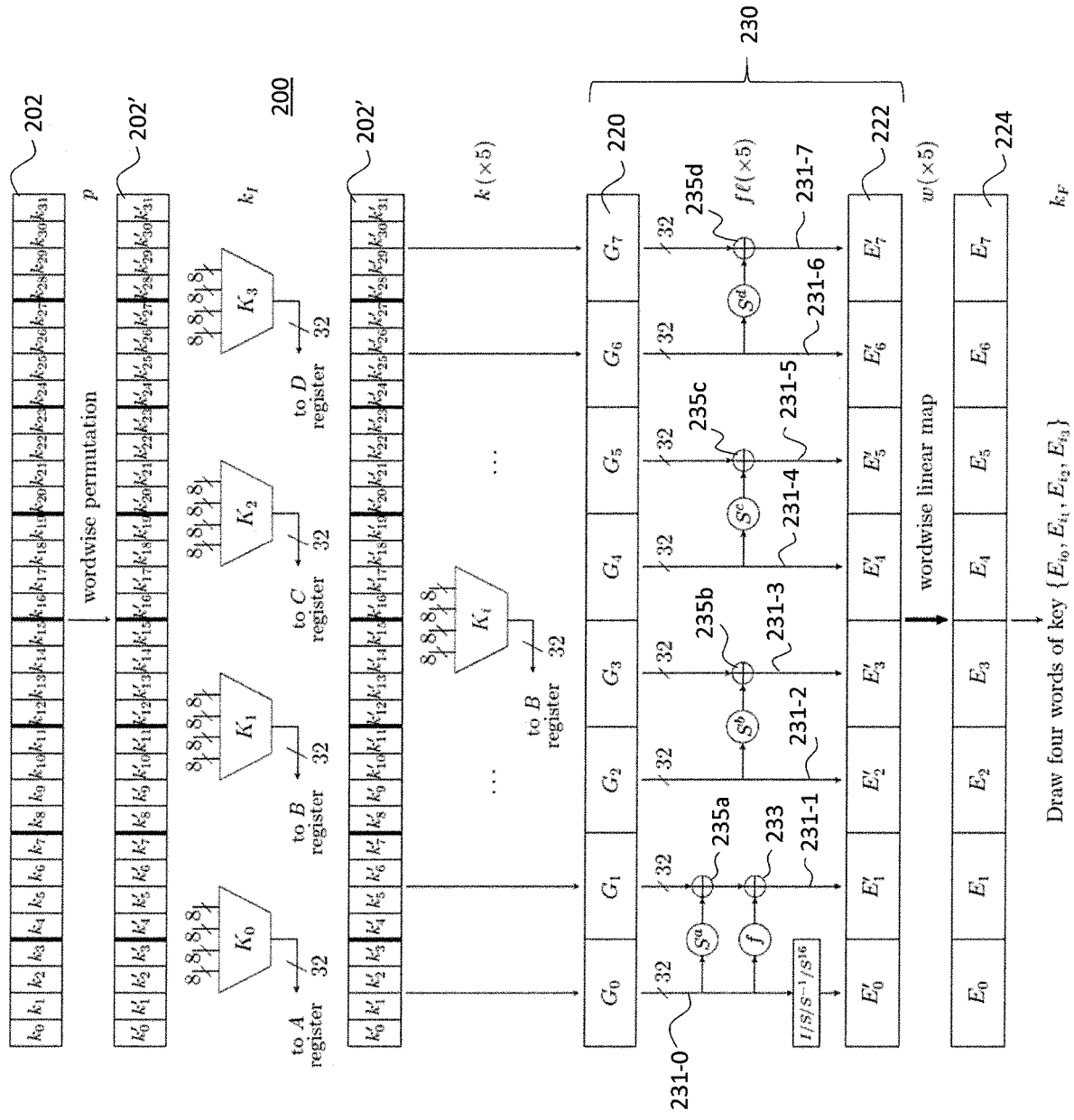
FIG. 3 is a block diagram schematically illustrating a main key processing unit in a universal devices formed in accordance with one exemplary embodiment of the present invention.

Referring now to FIGS. 2-3, they schematically illustrate certain portions of a main block processing unit 100 and a main key processing unit 200 of a UC device implemented in accordance with one exemplary embodiment of the present invention. The UC device in this embodiment is illustrated with reference to a block cipher cryptographic processing application involving blocks of data containing 128 bits. This is but one example, and the subject UC device may be suitably implemented in other embodiments to accommodate 256-bit or other suitable data block sizes employed by various cipher cryptographic processing techniques known in the art.

The UC device generally provides hardware that is selectively configurable responsive to a predetermined set of configuration data bits to form one of a plurality of different block cipher cryptographic processing circuits. The same UC device may thus be selectively configurable in this manner to take the form of various block cipher cryptographic processing circuits at different times. And by variably controlling the UC device's circuit configuration and suitably pipelining different processing configurations, overall processing throughput may be adaptively varied.

The UC device includes at least one main block processing unit 100, such as illustrated in FIG. 2, and at least one main key processing unit 200, such as illustrated in FIG. 3, coupled to the main block processing unit 100. As noted in preceding paragraphs, the hardware elements of the main block and main key processing units 100, 200 are shown partially preconfigured to the extent permitted to preserve their scope of universal applicability. They are also partially preconfigured, ideally, to the extent necessary to minimize the load of configuration bits required for full configuration (and the redundancy of configurable logic gate and interconnect portions, for instance) without unduly compromising the identifying details of the particular block cipher cryptographic processing circuit to be implemented by the units for a particular application.

When fully configured, the main block processing unit 100 in certain applications executes over multiple rounds of processing to carry out encryption, and over multiple rounds of processing (typically the same number as for encryption) to carry out corresponding decryption. Consistent with the symmetric key feature of the block cipher cryptographic processing implemented, the corresponding encryption and decryption processing employ the same version of the key for each round of processing.

Different versions of the key may be used for the various rounds of processing. These versions of the key used for different rounds, or the so-called round keys, are generated for each round by the main key processing unit 200. More specifically, the main key processing unit 200 executes responsive to certain portions of the configuration data to generate a plurality of round keys preferably based on a predetermined cryptographic variable which serves as the original key for the given encryption/decryption processing.

In the 128-bit block cipher application illustrated in FIG. 2, the main block processing unit 100 generally includes at least one block input storage unit 110 and at least one block output storage unit 120. Each of these input/output block storage units 110, 120 stores data in a predetermined number of segments, such as the segments A, B, C, D and A', B', C', D' in the example shown. For the 128-bit block size employed in the embodiment shown, each block storage unit 110, 120 is preferably implemented by one or more registers or by other suitable memory media known in the art to store the 128 bits of data making up a block as it undergoes the necessary processing. Each of the segments A-D, A'-D' in the illustrated embodiment thus contains 32 bits of the 128-bit data block as it undergoes the rounds of processing. Moreover, each of the 32-bit segments A-D, A'-D' of data may be stored in a separate register. The 32 bits define a word of data, which may be: formed collectively by four bytes of data, with each byte in certain applications containing the 8 bits necessary to express two 4-bit hexadecimal values (0 through F).

The main block processing unit 100 also includes a basic data portion 130 which forms a plurality of operational channels 131A, 131B, 131C, 131D extending between corresponding segments of data A and A', B and B', C and C', D and D' as stored in the block input and output storage units 110, 120. The basic data portion 130 includes a plurality of basic processing stages which may be established and/or intercoupled in variously selected ways, as prescribed by the given configuration data bits. Thus, different forms of block cipher cryptographic processing may be selectively established, for selective activation in different combinations. The basic processing stages preferably include at least a nonlinear map (F) stage disposed in at least the first operational channel 131A, a linear map (L) stage coupled to each of the operational channels 131A, 131B, 131C, 131D shown, and a round key (K) stage disposed in at least a second of the operational channels 131B.

The nonlinear map stage F is coupled in parallel with an accompanying bypass stage to a multiplexer 132 or other suitable data selecting/switching element known in the art. The multiplexer 132 operates responsive to the configuration data to selectively couple the nonlinear map stage F and its bypass stage in mutually exclusive manner. Accordingly, data within the first operational channel 131A passes through one—but not both—of these parallel stages before being output by the multiplexer 132. This output data is preferably combined with the output data from the linear map stage L by a bitwise adder 133A which effectively executes a logic exclusive-OR (XOR) operation thereon. The bit values resulting from this XOR combination of data within the first operational channel 131A are then passed for storage as segment A' of data in the block output storage unit 120.

Figure 5:
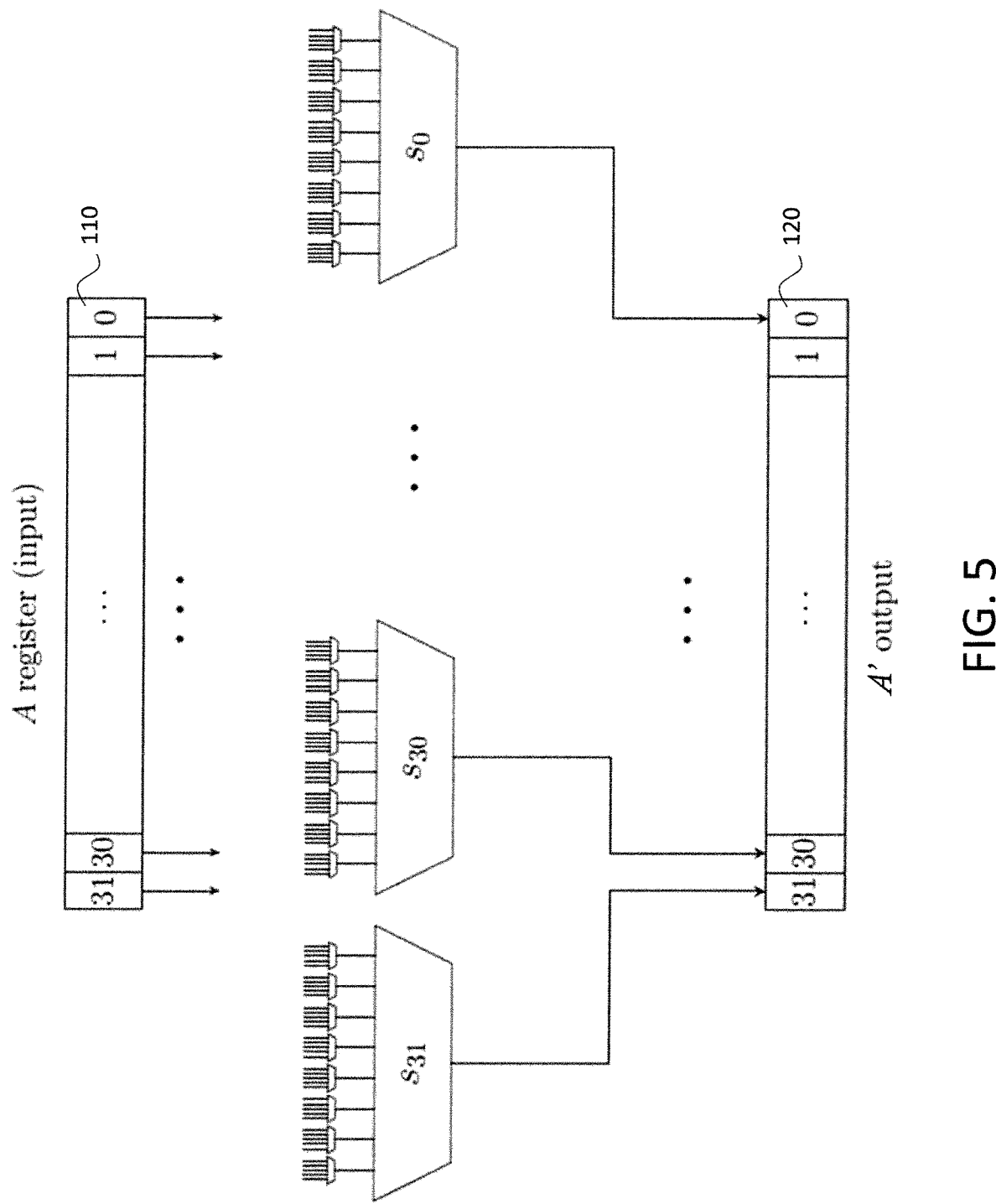

The nonlinear map stage F is configured to execute a preselected nonlinear conversion on input data received from one of the segments A, B, C, D of data stored at a given time (such as during a given clock cycle) in the block input storage unit 110. For example, the nonlinear map stage F is defined in the embodiment shown as a nonlinear function suitably applied using 32 configurable lookup tables (LUT) logically modeled by 32 corresponding multiplexers (as illustrated in FIG. 5). Each LUT multiplexer may be configured with its truth table values selectively set by corresponding configuration bits so as to reflect the particular nonlinear conversion to be applied. Each LUT in the embodiment shown receives the 32 bits of data as segment A of the block input unit 110 and generates 32 output bits according to its truth table values.

The linear map stage L is operably coupled responsive to the configuration data to linearly transfer input data received from a selected one of the segments A, B, C, D in the block input unit 110 to one or more operational channels 131A, 131B, 131C, 131D. In the embodiment shown, a multiplexer 134 or other suitable data selecting/switching element known in the art selects the segment A, B, C, D to be linearly mapped according to the corresponding configuration bits. The linearly mapped output of the L stage is then XOR-combined with the data one or more of the operational channels by respective bitwise adders 133A-133D. The L stage is preferably implemented in this embodiment as a 32-bit to 32-bit linear map that selectively shifts the bit contents of the given data segment in the manner determined by the configuration bits.

The round key stage K is disposed as shown in the second operational channel 131B to introduce at a bitwise adder 135 the round key $K_i$ as generated by the main key processing unit 200 for the current round of block cipher processing. An upstream bitwise adder 133B also disposed in the second operational channel 131B receives data from one of the segments within the block input unit 110, such as segment B, and XOR-combines the data with the contents of the current round's linearly mapped output of the L stage. The round key $K_i$ is then XOR-combined at the adder 135 with the output of the upstream adder 133B, preferably also with a corresponding 32-bit constant $cnt_i$. The resulting output of the bitwise adder 135 is further XOR-combined at a downstream bitwise adder 135' with the output of the F nonlinear map stage generated in the first operational channel 131A. The bit values resulting from this downstream combination are then passed along the second operational channel 131B for storage as segment B' in the block output storage unit 120.

The remaining channels in the illustrated embodiment, namely the third and fourth operational channels 131C, 131D, are each configured in the illustrated embodiment to XOR combine the data received and passed by the channel with the linear mapped output of the L stage (as established responsive to the configuration bits). A bitwise adder 133C is disposed in the third operational channel 131C, which receives data from one of the segments in the block input unit 110, such as segment C, and XOR-combines the data with the contents of the current round's linearly mapped output of the L stage. Likewise, a bitwise adder 133D is disposed in the fourth operational channel 131D, which receives data from one of the segments stored in the block input unit 110, such as segment D, and XOR-combines that data with the contents of the current round's linearly mapped output of the L stage. The results of the XOR-combination in the third and fourth operational channels 131C, 131D are stored as respective segments C', D' within the block output storage unit 120.

As illustrated in FIG. 2, the main block processing unit 100 receives a block 102 of payload data to be encrypted or decrypted. The block 102 in this example is formed by 16 bytes $b_0, b_1, \ldots, b_{15}$ of data, each 8 bits long, for a total size of 128 bits. The main block processing unit 100 preferably includes a permutation stage P, which is selectively established responsive to corresponding configuration bits to carry out a predetermined bytewise reordering of the payload data. This bytewise permutation yields a permuted block 102' of payload data bytes $b_0', b_1', \ldots, b_{15}'$.

Depending on the particular block cipher cryptographic techniques employed for a given embodiment and application, the permutation stage P may or may not actually carry out a reordering of the payload data. For AES or various invertible block cipher cryptographic techniques known in the art, stage P does carry out a suitable reordering of the payload data.

The main block processing unit 100 preferably also includes a pre-add stage $K_I$, which is selectively established responsive to corresponding configuration bits. The pre-add stage Ky executes bitwise addition of corresponding round pre-keys $K_0$, $K_1$, $K_2$, $K_3$ and multi-bit pre-constants $cnt_0$, $cnt_1$, $cnt_2$, $cnt_3$ with respective groupings of the permuted bytes $b_0'$, $b_1'$, ..., $b_{15}'$ of payload data. The bitwise addition preferably entails XOR-combination of the pre-keys and pre-constants with the permuted bytes, the results being stored as respective segments A, B, C, D in the block input storage unit 110.

The illustrated embodiment is configured to employ a word size of 32 bits (as may be formed collectively by the contents of four 8-bit bytes) for segment-wise, or word-wise, mapping of data. Accordingly, each of the round pre-keys $K_0$, $K_1$, $K_2$, $K_3$ is suitably generated by the main key processing unit 200 in the illustrated embodiment to form, for example, 32 bits of key. And each of the pre-constants $cnt_0$, $cnt_1$, $cnt_2$, $cnt_3$ is suitably established for the given embodiment and application responsive to corresponding configuration bits to form, for example, a 32-bit constant.

Preferably, the basic processing portion 130 of the main block processing unit 100 further includes a segment-wise linear map stage W, which is selectively established according to its corresponding configuration bits. This stage W executes to linearly transfer between selected segments A', B', C', D' of data in the block output storage unit 120 in predetermined manner, according to the configuration bits. In the illustrated embodiment, the linear mapping occurs word-wise as follows:

$$W:(A',B',C',D') \to (A_1,B_1,C_1,D_1)$$

Thus, each of the data segments $A_1$, $B_1$, $C_1$, $D_1$ in storage unit 122 may be—in effect—configured to store any linear combination of the data segments A', B', C', D'.

The main block processing unit 100 in certain embodiments and applications additionally includes a post-add stage $K_F$, which is selectively established according to its corresponding configuration bits. The post-add stage $K_F$ executes bitwise addition of corresponding words of post-key $K_T$, $K_{T+1}$, $K_{T+2}$, $K_{T+3}$ and post-constant words $cnt_T$, $cnt_{T+1}$, $cnt_{T+2}$, $cnt_{T+3}$ with the words of data stored in the registers for $A_1$, $B_1$, $C_1$, $D_1$. The resulting XOR-combination of the post-key words, post-constant words, and data are respectively stored as segments $A_{final}$, $B_{final}$, $C_{final}$, $D_{final}$ in a given storage unit 124.

The segments making up a block of data are shown for illustrative purposes much as if stored in separate storage units upon execution by different stages of the main block processing unit 100. But depending the particular embodiment and application, certain sets of differently designated data segments (such as A-D, A'-D', $A_1$-$D_1$, $A_{final}$-$D_{final}$) may represent different states of the data as stored in the same storage unit(s) at/during different stages of processing as it undergoes encryption or decryption. For example, the storage units 122, 124 respectively storing the data segments $A_1$-$D_1$ and $A_{final}$-$D_{final}$ may be implemented as separate registers or other physical storage media from the storage unit 120 in the illustrated embodiment. Alternatively, one or both of the storage units 122, 124 may actually be formed by the same physical storage media forming the storage unit 120, with the data segments $A_1$-$D_1$ and $A_{final}$-$D_{final}$ denoting the values/states stored therein as the data undergoes different stages of block processing.

As indicated in FIG. 2, the various operational stages of the main block processing unit 100 in operation are preferably executed in respectively assigned numbers of iterations during a given round of block cipher processing. For example, the permutation stage P, pre-add stage $K_I$, and post-add stage $K_F$ are each executed once during a given round of block cipher processing, whereas the F, L, K, and W stages of basic data portion 130 (disposed in operational sequence between the pre-add and post-add stages) are each executed over five iterations during a given round. Progression of the main block processing unit 100 stages during a round of block cipher processing then occurs as follows, sequentially from left to right:

$$PK_I(FLK)W(FLK)W(FLK)W(FLK)W(FLK)WK_F = PK_I((FLK)W)^5 K_F$$

To enhance efficiency of operation, multiple copies of the main block processing unit 100 may be implemented in parallel to concurrently process multiple blocks of data undergoing encryption or decryption. In certain applications, for instance, data storage segments/registers of one main block processing unit 100 may be loaded with payload data from either an external source or from the final states of block data segments resulting from the block processing carried out by a preceding unit 100. Pipeline processing may be suitably carried out in this manner.

Turning now the key schedule employed by UC device, operation of the main block processing unit 100 is keyed according to a key schedule which includes two main parts. The first part of the key schedule preferably includes one or more suitable storage units in which certain predefined pre-key and post-key values for a round of block cipher processing are stored. In the illustrated embodiment and application, for example, two 128-bit registers, $K_{pre}$ and $K_{post}$, are employed whose contents remain fixed. Each register is filled with 128 configuration bits making up sixteen bytes of respective pre-key and post-key values, as follows:

| $K_{pre}^0$ | $K_{pre}^1$ | $K_{pre}^2$ | ... | $K_{pre}^{15}$ |
|---|---|---|---|---|
| $K_{post}^0$ | $K_{post}^1$ | $K_{post}^2$ | ... | $K_{post}^{15}$ |

The second part of the key schedule preferably includes the main key processing unit 200, an exemplary embodiment of which is schematically illustrated in FIG. 3. The main key processing unit 200 is accordingly configured responsive to corresponding configuration bits, and serves to generate the round keys required for proper execution of the main key processing unit 100 based on a preselected cryptovariable. As shown, the main key processing unit 200 includes registers or other suitable storage media to receive a cryptovariable 202. In the illustrated embodiment, the cryptovariable 202 includes 256 bits of key, for example, which are loaded bytewise left to right as shown, preferably in 32 registers $k_0$, $k_1$, ..., $k_{31}$.

The main key processing unit 200 preferably includes a key permutation stage p, which is selectively established responsive to corresponding configuration bits to carry out a predetermined wordwise reordering of the cryptovariable 202 bits. The wordwise permutation p operates eight 32-bit words (made up by groupings of four 8-bit bytes $k_0$-$k_3$, $k_4$-$k_1$, $k_8$-$k_1$, $k_{12}$-$k_{15}$, ..., $k_{28}$-$k_{31}$). This yields a permuted cryptovariable, or reordered key 202', formed by the key words as stored in key registers $k_0'$, $k_1'$, ..., $k_{31}'$.

Depending on the particular block cipher cryptographic techniques employed for a given embodiment and application, the key permutation stage p may or may not actually carry out a reordering of the cryptovariable words. For AES or various invertible block cipher cryptographic techniques known in the art, key permutation stage p does carry out a suitable reordering of such cryptovariable words.

The main key processing unit 200 preferably also includes a key pre-add stage $k_I$, which is selectively established responsive to corresponding configuration bits. The key pre-add stage $k_I$ serves to derive four 32-bit words of round pre-keys $K_0, K_1, K_2, K_3$ applied at the pre-add stage $K_I$ of the main block processing unit 100. Depending on the particular application, the round pre-key words $K_0, K_1, K_2, K_3$ may be drawn either directly from the fixed contents of the $K_{pre}$ registers or from the key 202' of the key registers $k_0', k_1', \ldots, k_{31}'$. This may be optionally selected, for instance, by setting one or more corresponding configuration bits.

In either case, the key pre-add stage $k_I$ executes as selectively configured to form each of the pre-key words $K_0, K_1, K_2, K_3$, from any combination of input bytes drawn from the appropriate registers. If the input bytes are drawn from the key registers $k_0', k_1', \ldots, k_{31}'$, the pre-key words are formed from any combination of 32 bytes of key. If drawn from the fixed $K_{pre}$ registers, however, only 16 bytes are available, so the pre-key words are formed from any combination of those 16 bytes of key. The resulting pre-key words $K_0, K_1, K_2, K_3$ are passed to the main block processing's pre-add stage $K_I$ for suitable respective use thereby in generating the data segments A, B, C, D.

The main key processing unit 200 also includes key input and key output storage units 220, 222 respectively storing predetermined numbers of key data segments, each of which is preferably loaded with a 32-bit word of key retrieved from the given cryptovariable. The main key processing unit 200 includes as well a basic key portion 230 that forms a plurality of update channels 231-0, . . . , 231-7 extending between the key input and key output storage units 220, 222 to pass respective segments of key therethrough. The basic key portion 230 preferably includes a round key generation stage k that executes to selectively generate the round keys required for proper execution of the main block processing unit 100. The basic key portion 230 also includes a key update stage fl operably coupled to the update channel. A nonlinear part f of this key update stage fl is selectively coupled responsive to corresponding configuration bits to execute a preselected nonlinear conversion on a segment of key data in at least a first update channel 230-0 for application to a second update channel 230-1. A linear part/of the key update stage is operably coupled responsive to its corresponding configuration bits to one or more selected update channels. The linear part/is implemented to execute a preselected linear conversion on the key data in a selected update channel for application to another update channel.

In the illustrated embodiment, the round key selection stage k is selectively established responsive to corresponding configuration bits to form a 32-bit round key word $K_i$ as a combination of four bytes configurably drawn from the key 202' of the key registers $k_0', k_1', \ldots, k_{31}'$. Unlike the key pre-add stage $k_I$, neither the k stage nor the fl stage draws from the fixed registers $K_{pre}, K_{post}$. The round key word $K_i$ resulting from the round key selection stage k is passed to the main block processing's round key stage K for suitable use thereby in generating one or more of the data segments A', B', C', D'. In the embodiment and application illustrated in FIG. 2, for example, the round key word $K_i$ is passed to the second operational channel 131B for bitwise addition at the adder 135. Respective groupings of bytes making up the key 202' in the registers $k_0', k_1', \ldots, k_{31}'$ are selectively drawn to define the round key word $K_i$.

The key update stage fl is selectively established responsive to corresponding configuration bits, and disposed to operate on the key words $G_0, G_1, \ldots, G_7$ in storage unit 220. The key words $G_0, G_1, \ldots, G_7$ contain respective 4-byte segments of the key 202' from the key registers $k_0', k_1', \ldots, k_{31}'$. The nonlinear f part of the fl stage operates to apply a predetermined nonlinear conversion on the key word $G_0$ and pass the result on to an adder 233 for bitwise XOR-combination thereby with the output of an upstream adder 235a (described in following paragraphs). The output of the adder 235 is stored as key word/segment $E_1'$ of a storage unit 222.

This nonlinear f part of the fl stage is analogous in structure and operation to the nonlinear map stage F of the main block processing unit 100, except in several notable respects. First, the f part of this fl stage may be implemented using only eight 8-bit to 1-bit LUTs, for instance, rather than the 32 40-bit to 1-bit LUTs employed for the nonlinear map stage F (such as illustrated in FIG. 5). Second, one of the four bytes $k_0', k_1', k_2', k_3'$ making up the key word $G_0$ may be selected as the input to all eight of the LUTs defining the f part. The input of this f part of the key update stage fl may be determined, therefore, responsive to as few as two corresponding configuration bits $s_0, s_1$. Third, a byte output N of the f part XOR-combines into precisely one of the four bytes of the key word Er' in the storage unit 220, such that as few as two configuration bits s2, s3 may be employed to determine which of the four Er' bytes the output N bitwise adds into. Not that this f part in certain embodiments and applications could simply be configured to provide a linear mapping, in order to avoid nonlinearity.

The linear/part of the fl stage is selectively established responsive to corresponding configuration bits, and also disposed to operate on the key words $G_0, G_1, \ldots, G_7$ from the storage unit 220. This linear/part of the fl stage includes a plurality of left-circular shift operations $s^a, s^b, s^c, s^d$ where S represents a baseline one-bit shift in position of bits to the left within a 32-bit word, with wraparound of end bits. The number of such baseline left-circular baseline shift S to be carried out is specified by the 5-bit shift parameters a, b, c, d each selectively set responsive to corresponding configuration bits to one of the 32 possible values $\{0, 1, \ldots, 31\}$.

As shown, the left-circular shift operations $S^a, S^b, S^c, S^d$ are respectively applied in the illustrated embodiment to the key words $G_0, G_2, G_4, G_6$. Their left-circular shifted results are then bitwise added respectively to their adjacent key words $G_1, G_3, G_5, G_7$ at the adders 235a, 235b, 235c, 235d then stored in storage unit 222 as key words $E_1', E_3', E_5', E_7'$. In addition, the key word $G_0$ is left-circularly shifted by one of four alternative shift values: a null shift value I, a one-bit shift S, an inversely directed one-bit shift $S^{-1}$ (right-circular), and a 16-bit shift $S^{16}$, with the choice of these alternative shift values being selected responsive to as few as two corresponding configuration bits $r_0, r_1$. The selectively shifted version of the key word $G_0$ is then stored as key word $E_0'$ in the storage unit 222.

Preferably, the main key processing unit 200 further includes a key linear map stage w and a key post-add stage $k_F$ which are selectively established according to their corresponding configuration bits. The linear map stage w executes to segment-wise apply a selectively configured binary matrix by bitwise adding the same to each of the key words $E_0', \ldots, E_7'$. The results are entered in the storage unit 224 as the final key words $E_1, \ldots, E_7$. The key post-add stage $k_F$ executes as selectively configured to form the post-key words $K_T, K_{T+1}, K_{T+2}, K_{T+3}$ applied by the post-add stage Kr of the main block processing unit 100.

The post-add stage $k_F$ is structurally and functionally analogous to the key pre-add stage $k_I$ in the illustrated embodiment, except that it forms the based on a selected combination of 32-bit input words of key $\{E_{i_0}, E_{i_1}, E_{i_2}, E_{i_3}\}$ (rather than bytes in the case of stage $k_f$) drawn from either the key registers of the storage unit 224 or the fixed $K_{post}$ registers. If the input words $E_{i_0}, E_{i_1}, E_{i_2}, E_{i_3}$ are drawn from the key registers, the post-key words $K_T, K_{T+1}, K_{T+2}, K_{T+3}$ may be suitably formed as needed based on any combination of the final key words $E_1, \ldots, E_7$. For example, each of the post-key words may simply be set to respective ones of the input words, such as: $K_T = E_{i_0}, K_{T+1} = E_{i_1}, K_{T+2} = E_{i_2}, K_{T+3} = E_{i_3}$. Alternatively, if the input words $E_{i_0}, E_{i_1}, E_{i_2}, E_{i_3}$ are drawn from the fixed $K_{post}$ registers, only four words are available, so the post-key words $K_T, K_{T+1}, K_{T+2}, K_{T+3}$ are suitably formed as needed based on those four words of key. The source of input words may be optionally selected, for instance, by setting one or more corresponding configuration bits.

As indicated in FIG. 3, the various operational stages of the main key processing unit 200 in operation are preferably executed in respectively assigned numbers of iterations during a given round of block cipher processing, in coordination with the main block processing stage 100. For example, the key permutation stage p, key pre-add stage $k_f$, and key post-add stage $k_F$ are each executed once during a given round of block cipher processing, whereas a basic key portion 230 containing the f, l, k, and w stages (and disposed in operational sequence between the pre-add and post-add stages) is executed over five iterations during a given round. Progression of the main key processing unit 200 stages during a round of block cipher processing then occurs as follows, sequentially from left to right:

$$pk_f(flk)w(flk)w(flk)w(flk)w(flk)wk_F = pk_f((flk)w)^5 k_F$$

To enhance efficiency of operation, multiple copies of the main key processing unit 200 may be implemented in parallel to pair with respective copies of the main block processing unit 100, as multiple blocks of data are concurrently processed for encryption or decryption. In certain applications, for instance, storage units of one main key processing unit 200 may be loaded with key blocks from either an external source or from the final states of key block segments resulting from the block processing carried out by a preceding unit 200. Pipeline processing may be suitably supported in this manner.

Example: Configuration of Certain Stages, Main Block Processing Unit

The main block and main key processing units 100, 200 of the subject UC device may be configured with considerably fewer configuration bits than with configurable circuit devices heretofore known. For example, The FLK stages of the basic data portion 130 in the main block processing unit 100 may be suitably configured in the illustrated embodiment with less than 4500 configuration bits. The L stage may be substantially configured through 1024 configuration bits, the F stage may be substantially configured through 3328 configuration bits, and certain incidental operations may be substantially configured through several additional bits $u_0$, $u_1$, $t_0$, $t_1$, $t_2$, $t_3$, $t_4$, such as described in following paragraphs.

Figure 4:
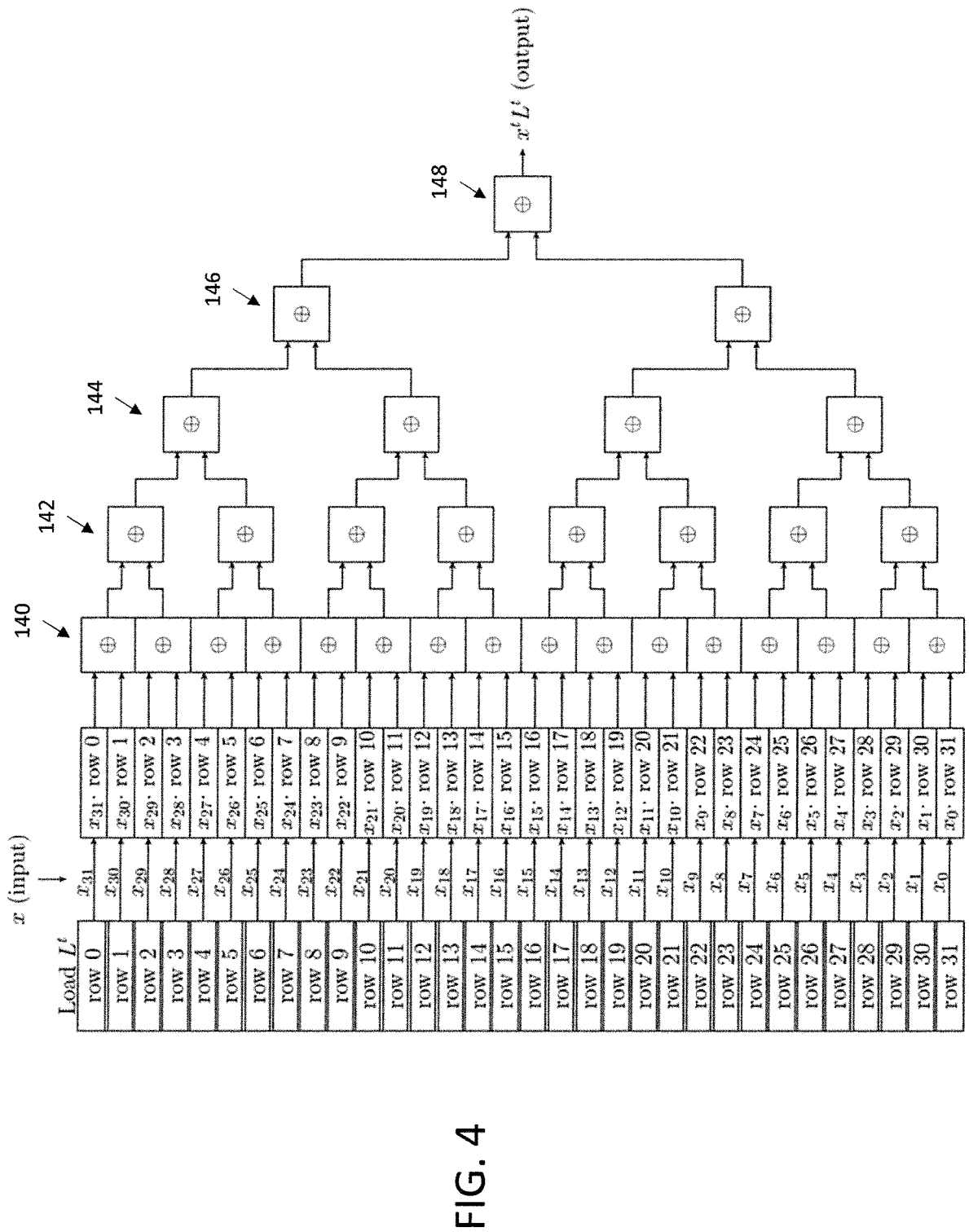
FIG. 4 is a block diagram schematically illustrating a linear map stage within the main block processing unit in a universal devices formed in accordance with one exemplary embodiment of the present invention; and, FIG. 5 is a block diagram schematically illustrating a nonlinear map stage within the main block processing unit in a universal devices formed in accordance with one exemplary embodiment of the present invention.

FIG. 4 schematically illustrates one exemplary embodiment of a linear map stage L, or L stage, of the main block processing unit 100 which operates on a segment of the data x (input) to be processed. The L stage in this embodiment preferably establishes, for example, a 32×32 matrix to define a linear map. The 32 rows of this linear map are each 32-bits long, and the individual entries are loaded row by row with 1024 corresponding configuration bits. As shown, the linear map stage L is suitably applied as row vectors (formed by entries in the same column across the 32-rows) to respective bits $x_{31}, x_{30}, \ldots, x_0$ of a 32-bit segment of input data x. The bits in resulting segment of data are then subjected to successive levels 140, 142, 144, 146, 148 of XOR-combination. The effect of this is represented as follows:

$$\mathcal{L} := xL = \bigoplus_{j=0}^{31} x_{(31-j)} L_j.$$

In computing the output xL in this manner for $x = x_{31}$, $x_{30}, \ldots, x_0$, the data of row $31-i$ is copied to column 2, if $x_i = 1$. Otherwise, the value 0 is entered in column 2.

Referring to FIG. 5, one exemplary embodiment is illustrated for the nonlinear map stage F, or F stage, which defines a nonlinear function suitably implemented by LUTs which are selectively configurable according to their corresponding configuration bits. In the particular embodiment shown, 32 LUTs $s_{31}, \ldots, s_0$ are employed, with each LUT carrying out an 8-bit to 1-bit mapping of data in the manner configured. Each LUT $s_i$ is accordingly configured to receive eight input bits; and, each input bit is selected from among the 32 bits of data in segment A of data in block input storage unit 110 by a 5-bit to 1-bit MUX that is likewise configurable. The outputs of the LUTS $s_{31}, s_{30}, \ldots, s_0$ in suitable order collectively form the F stage output for this segment of data, or segment A' as stored in the block output storage unit 120 (as represented by Equation (1) below).

Each LUT $s_i$ uses 256 configuration bits to set its truth table, with the provision that each $s_i = s_j$ whenever $i \equiv j \pmod{8}$. Thus, only eight distinct truth tables can be configured, for a total of $8 \times 256 = 2048$ bits of configuration data. As each of the 32 LUTs requires eight inputs, and as each input takes five bits of configuration data for selective identification from the 32 bits of data in segment A, the 32 LUTs in total necessitate $32 \times 8 \times 5 = 1280$ bits of configuration data for input configuration. The result is that $2048 + 1280 = 3328$ bits are needed to configure the nonlinear function employed by the F stage in the illustrated embodiment.

More specifically, configuration of the F stage in this embodiment preferably proceeds as follows.

With v denoting the 3328 F stage configuration bits and $F_v$ denoting the configured F stage function:

$$\tilde{F}: V^{3328} \times V^{32} \to V^{32}$$

For brevity, $\tilde{F}(v, A)$ may be simply denoted $F_v(A)$. In other words, the notation $\tilde{F}(v, A) = F_v(A)$ as used herein. Moreover, the subscript v at certain points herein may be suppressed in the interests of brevity and clarity, such that reference may be made simply to F rather than $F_v$.

The LUTs $s_i$ are each configured by specifying their truth tables as follows:

| $s_i(255)$ | $s_i(254)$ | $s_i(253)$ | ... | $s_i(0)$ |
| --- | --- | --- | --- | --- |

The five-bit quantity $b_{ij}$ that selectively identifies the particular bit of data from segment A which is used as the jth input bit (of the eight input bits) to a particular LUT $s_i$ is defined as follows:

$$b_{ij} := (b_{ij4} b_{ij3} b_{ij2} b_{ij1} b_{ij0})_2 = \sum_{k=0}^{4} b_{ijk} 2^k$$

The 8×5=40 configuration bits that configure the inputs of each LUT $s_i$ are then represented by $b_{i7}, b_{i6}, \ldots, b_{i0}$. Representing the 32 bits of the segment $A=(a_{31}, a_{30}, \ldots, a_0)$, the eight bit integer ai is defined as follows:

$$\alpha_i := (a_{bi7}a_{bi6}a_{bi5}a_{bi4}a_{bi3}a_{bi2}a_{bi1}a_{bi0})_2 = \sum_{k=0}^{7} a_{bik} 2^k$$

The output of LUT $s_i$ is then represented by $s_i(\alpha_i)$, and:

$$\mathcal{F} := F(A) = (s_{31}(\alpha_{31}), s_{30}(\alpha_{30}), \ldots, s_0(\alpha_0)) \quad (1)$$

Given that $\mathcal{L}$ denotes the output of the configured linear map stage L and $\mathcal{F}$ represents the output of the configured nonlinear map stage F, corresponding configuration bits may be applied as follows:

Configuration bits $u_0$ and $u_1$ may be employed to select the input to stage L:

$$\mathcal{L} = \begin{cases} AL & \text{if } (u_0, u_1) = (0, 0) \\ BL & \text{if } (u_0, u_1) = (0, 1) \\ CL & \text{if } (u_0, u_1) = (1, 0) \\ DL & \text{if } (u_0, u_1) = (1, 1) \end{cases}$$

Or, $$\mathcal{L} = (\bar{u}_0 \bar{u}_1 A \oplus \bar{u}_0 u_1 B \oplus u_0 \bar{u}_1 C \oplus u_0 u_1 D) L.$$

Configuration bits $t_0, t_1, t_2, t_3$ independently determine whether or not $\mathcal{L}$ is XOR-combined into the respective storage unit segments A', B', C', D'.

Bit $t_4$ determines which of the following mutually exclusive options (i) or (ii) would occur: (i) The contents of storage unit segment A XOR-combines with the contents of segment $A_0$ and the output $\mathcal{F}$ XOR-combines with both the segment $B_0$ (this would be the case where $t_4=1$ in the equations below); or, (ii) the output $\mathcal{F}$ XOR-combines with the contents of segment A, and such contents of segment A do not XOR-combine with the contents of any other storage unit segment (this would be the case where $t_4=0$ in the equations below). That is, the contents of storage unit segments A', B', C', D' would be determined as follows:

$$A' = t_4 A \oplus t_0 \mathcal{L} \oplus \bar{t}_4 \mathcal{F}$$

$$B' = B \oplus t_1 \mathcal{L} \oplus t_4 \mathcal{F} \oplus K_i \oplus cnt_i$$

$$C' = C \oplus t_2 \mathcal{L}$$

$$D' = D \oplus t_3 \mathcal{L}.$$

The wordwise linear map stage W applies a configurable 4×4 binary matrix $w=[w_{ij}]_{0 \leq i,j \leq 3}$, which would require 16 configuration bits, to four words of data. Thus:

$$A_1 = \omega_{00} A' \oplus \omega_{01} B' \oplus \omega_{02} C' \oplus \omega_{03} D'$$

$$B_1 = \omega_{10} A' \oplus \omega_{11} B' \oplus \omega_{12} C' \oplus \omega_{13} D'$$

$$C_1 = \omega_{20} A' \oplus \omega_{21} B' \oplus \omega_{22} C' \oplus \omega_{23} D'$$

$$D_1 = \omega_{30} A' \oplus \omega_{31} B' \oplus \omega_{32} C' \oplus \omega_{33} D'.$$

Examples: Reduced Configuration Bits and Reduced Hardware Redundancy

The subject UC device, as noted, yields substantial efficiencies in terms of reduced loads of configuration bits required for full configuration of the main block and main key processing units 100, 200 to implement particular type of block cipher cryptographic processing circuit. The UC device somewhat indirectly also yields substantial efficiencies in terms of the savings in redundant hardware elements. The partial preconfiguration of its hardware elements curtails the scope of possible circuits that may be realized by the device's use. The scope of realizable circuits may be thereby limited, for instance, to a certain predetermined range of supported circuits, such as the range of block cipher type cryptographic processing circuits of the illustrated embodiment. Any hardware elements not even prospectively utilized by any circuit realizable within this supported range of circuits are rendered superfluous, obviating the need for their inclusion on the UC device.

Admittedly, the configurational agility provided by the UC device is not without tradeoffs. For example, as compared to custom integrated circuit devices, there is nontrivial overhead associated with configurably implementing a particularly selected block cipher cryptographic processing circuit. Certain embodiments and applications of the UC device with a pipeline sufficiently deep to fully unroll many unrelated cryptographic algorithms, for instance, require on the order of several million gates. Nonetheless, this is considerably less burdensome, hence more manageable, than the billions of gates typically required by other more flexible circuit device options heretofore known in the art.

Preferably, two types of configuration bits are employed in the illustrated embodiment. One type serves to configure the main data path for the block of payload data being processed. Another type serves to configure the key expansion to generate the various the various key values such as round keys, pre-keys, post-keys, and the like. So in the case of the main block processing unit 100, for example, the progression of its stages during a round of block cipher processing $PK_I((FLK)W)^5 K_F$ then involves the setting of corresponding configuration bits such as illustrated in the example of Table I below:

TABLE I

| component | # config bits | comment |
|---|---|---|
| P | 64 | four bits for each address |
| $K_I$ | 128 | four 32-bit constants |
| F input | 1280 | 32 · 8 input bits, 5 bits to select each |
| F LUTs | 2048 | eight distinct 8-bit to 1-bit LUTs |
| F output | 1 | $t_4$ |
| L input | 2 | $u_0, u_1$ |
| L | 1024 | 32 × 32 matrix $[a_{ij}]_{0 \leq i,j \leq 31}$ |
| L output | 4 | $t_0, t_1, t_2, t_3$ |
| K | 32 | 32-bit constant |
| W | 16 | 4 × 4 matrix $[w_{ij}]_{0 \leq i,j \leq 3}$ |
| $K_F$ | 128 | four 32-bit constants |
| total (basic data step) | 4407 | P, $K_I$, $K_F$, and 5 basic data steps |
| total (main data block) | 22355 | |

Of the progression of steps for the overall main block processing unit 100, for each iteration of the basic data portion 130, or (FLK)W, the number of corresponding configuration bits to be set totals 1280+2048+1+2+1024+4+32+16=4407 bits. And for the main block processing unit 100 overall, the number of corresponding configuration bits to be set totals 64+128+5×4407+128=22355 bits.

In the case of the main key processing unit 200, for example, the progression of its stages to carry out key expansion for a round of block cipher processing $pk_1(flk) w)^5 k_F$ involves the setting of corresponding configuration bits such as illustrated in the example of Table II below:

TABLE II

| component | # config bits | comment |
|---|---|---|
| p | 24 | eight 3-bit addresses |
| $k_I$ switch | 1 | choose $K_{pre}$ or main key |
| $k_I$ addresses | 80 | sixteen 5-bit addresses |
| $k_I$ zeroize | 4 | $c_0, c_1, c_2, c_3$ can independently zeroize 4 words |
| f input | 2 | $s_0, s_1$ select a byte from $G_0$ register |
| f LUTs | 2048 | eight 8-bit to 1-bit LUTs |
| f output | 2 | XOR into byte within $E'_1$ register ($s_2, s_3$) |
| l barrel shifts | 20 | four 5-bit quantities a, b, c, d |
| l $I/S/S^{-1}/S^{16}$ choice | 2 | |
| k addresses | 20 | four 5-bit quantities |
| k zeroize | 1 | |
| w | 64 | 8 × 8 matrix |
| $k_F$ switch | 1 | choose $K_{post}$ or main key |
| $k_F$ addresses | 12 | four 3-bit address |
| $k_F$ zeroize | 4 | $d_0, d_1, d_2, d_3$ can independently zeroize 4 words |
| total (basic key step) | 2159 | p, $k_I$, $k_F$, and 5 basic key steps |
| total (main key block) | 10921 | |

This progression of steps for the overall main key processing unit 200 may include certain additional processes requiring configuration. One example is a barrel shifting process, which requires an additional 4×5=20 bits of configuration in the illustrated embodiment. Other examples include the configuration bits $r_0$, $r_1$ for the two-bit choice from the four alternative circular shift values for the key word $G_0$; and, a 1-bit switch which determines whether a key is added in the key pre-add stage $k_1$.

Of the overall progression of steps involved in key expansion, each iteration of the basic key portion 230, or (flk)w, the number of corresponding configuration bits to be set totals 2+2048+2+20+2+20+1+64+1=2159 bits. And for the main key processing unit 200 overall, the number of corresponding configuration bits to be set totals 24+85+5×2159+17=10921 bits.

In total, one block of the codebook and the key schedule requires 22355+10921=33276 configuration bits. Adding 4 bits of zeroes for ease of implementation yields a total of 33280 configuration bits for one block. For multiple blocks, a configuration bit string for each additional block may simply be concatenated. An example of the configuration bits corresponding to one block's worth of configuration bits is shown in Table III below.

A fully unrolled AES-256 encryption such as in the illustrated embodiment requires 14 blocks, or 14×33280=465920 configuration bits. For many block cipher cryptographic techniques, of course, the configuration bits corresponding to distinct steps may be identical or closely related. So it may often be possible to significantly compress configuration data files.

TABLE III

| bits | component | comment |
|---|---|---|
| [0, 63] | P | |
| [64, 191] | $K_i$ | |
| [192 + 4407 k, 1471 + 4407 k] | F input | step k, 0 ≤ k ≤ 4 |
| [1472 + 4407 k, 3519 + 4407 k] | F LUTs | step k, 0 ≤ k ≤ 4 |
| 3520 + 4407 k | F output | step k, 0 ≤ k ≤ 4 |
| [3521 + 4407 k, 3522 + 4407 k] | L input | step k, 0 ≤ k ≤ 4 |
| [3523 + 4407 k, 4546 + 4407 k] | L | step k, 0 ≤ k ≤ 4 |
| [4547 + 4407 k, 4550 + 4407 k] | L output | step k, 0 ≤ k ≤ 4 |
| [4551 + 4407 k, 4582 + 4407 k] | K | step k, 0 ≤ k ≤ 4 |
| [4583 + 4407 k, 4598 + 4407 k] | W | step k, 0 ≤ k ≤ 4 |
| [22227, 22354] | $K_F$ | |
| [22355, 22378] | p | |
| 22379 | $k_I$ switch | |
| [22380, 22459] | $k_I$ addresses | |
| [22460, 22463] | $k_I$ zeroize | |
| [22464 + 2159 k, 22465 + 2159 k] | f input | step k, 0 ≤ k ≤ 4 |
| [22466 + 2159 k, 24513 + 2159 k] | f LUTs | step k, 0 ≤ k ≤ 4 |
| [24514 + 2159 k, 24515 + 2159 k] | f output | step k, 0 ≤ k ≤ 4 |
| [24516 + 2159 k, 24535 + 2159 k] | l, barrel shifts | step k, 0 ≤ k ≤ 4 |
| [24536 + 2159 k, 24537 + 2159 k] | l, $I/S/S^{-1}/S^{16}$ choice | step k, 0 ≤ k ≤ 4 |
| [24538 + 2159 k, 24557 + 2159 k] | k addresses | step k, 0 ≤ k ≤ 4 |
| 24558 + 2159 k | k zeroize | step k, 0 ≤ k ≤ 4 |
| [24559 + 2159 k, 24622 + 2159 k] | w | step k, 0 ≤ k ≤ 4 |
| 33259 | $k_F$ switch | |
| [33260, 33271] | $k_F$ addresses | |
| [33272, 33275] | $k_F$ zeroize | |
| [33276, 33279] | | padding |

Turning to gate counts, Table IV below shows one example of gate counts for the combinatorial circuitry required by the UC device 100 in the illustrated embodiment to implement a pipelined configuration:

TABLE IV

| Component | ANDs | ORs | XORs | NOTs | k-muxes |
|---|---|---|---|---|---|
| P | 128 · 30 | 128 · 15 | | 128 · 15 | 128 (k = 4) |
| $K_I$ | | | 256 | | |
| F input mux | 256 · 62 | 256 · 31 | | 32 · 31 | 256 (k = 5) |
| F | 32 · 510 | 32 · 255 | | 32 · 255 | 32 (k = 8) |
| F output demux | 96 | | 64 | | |
| L input mux | 32 · 6 | 32 · 3 | | 32 · 3 | 32 (k = 2) |
| L | 1024 | | 32 · 31 | | |
| L output demux | 128 | | | 128 | |
| K | | | 64 | | |
| W | 128 · 4 | | 128 · 3 | | |
| $K_F$ | | | 256 | | |
| total: basic data step | 34144 | 16192 | 1632 | 9248 | |
| total: main data block | 174560 | 82880 | 8672 | 48160 | |
| p | 256 · 14 | 256 · 7 | | 256 · 7 | 256 (k = 3) |
| $k_I$ switch | 128 · 2 | 128 · 1 | | 128 · 1 | 128 (k = 1) |
| $k_I$ addresses | 128 · 30 + 128 · 62 | 128 · 15 + 128 · 31 | | 128 · 15 + 128 · 31 | 128 (k = 4) 128 (k = 5) |
| $k_I$ zeroize | 128 | | | | |
| f input mux | 8 · 6 | 8 · 3 | | 8 · 3 | 8 (k = 2) |
| f | 8 · 510 | 8 · 255 | | 8 · 255 | 8 (k = 8) |
| f output demux | 32 | | 32 | | |
| l: barrel shifts | 4 · 32 · 5 · 2 | 4 · 32 · 5 · 1 | | 4 · 32 · 5 · 1 | 4 · 32 · 5 (k = 1) |
| l: barrel shift out | | | 128 | | |
| l: $I/S/S^{-1}/S^{16}$ | 32 · 6 | 32 · 3 | | 32 · 3 | 32 (k = 2) |
| k addresses | 32 · 62 | 32 · 31 | | 32 · 31 | 32 (k = 5) |
| k zeroize | 32 | | | | |
| | 256 · 8 | | 256 · 7 | | |
| $k_F$ switch | 128 · 2 | 128 · 1 | | 128 · 1 | 128 (k = 1) |
| $k_F$ addresses | 128 · 6 + 128 · 14 | 128 · 3 + 128 · 7 | | 128 · 3 + 128 · 7 | 128 (k = 2) 128 (k = 3) |
| $k_F$ zeroize | 128 | | | | |
| total: basic key step | 9696 | 3792 | 1952 | 3792 | |
| total: main key block | 67168 | 28176 | 9760 | 28176 | |
| TOTAL: basic step | 43840 | 19984 | 3584 | 13040 | |
| TOTAL: one block | 241728 | 111056 | 18432 | 76336 | |

Much of the circuitry is implemented as k-bit to 1-bit muliplexers (k-muxes) for k values ranging between 1 and 8. The right-most column of Table IV indicates the counts obtained in the AND, OR, and NOT columns. Thus all gates are accounted for in the AND, OR, XOR, and NOT columns.

Treating the logical ANDs and ORs to count as one gate equivalent, the logical XORs to count as two gate equivalents, and the logical NOTs as free (modify the circuit to absorb them into other components, so as to transform XORs in NXORs, or ANDs into NANDs, etc.), the combinatorial logic circuitry forming the main block processing unit 100 would require 241728+111056+2×18432=~390000 gate equivalents. Of these, about 272000 (70%) are accounted for by 8-1 LUTs and the mux circuitry that feeds them. While this does not account for the flip flops or other such components required for pipelining, they would typically occupy an order of magnitude less chip area than the combinatorial logic circuitry.

An illustrative example of the gate count to accommodate iterated operation of the implemented circuitry is shown in Table V below:

TABLE V

| | ANDs | ORs | XORs | NOTs |
|---|---|---|---|---|
| basic data step | 34144 | 16192 | 1632 | 9248 |
| iterative data block | 37984 | 18112 | 2144 | 11168 |
| basic key step | 9696 | 3792 | 1952 | 3792 |
| iterative key block | 28384 | 13008 | 1952 | 13008 |
| TOTAL: iterative block | 66368 | 31120 | 4096 | 24176 |

As shown, a configuration to carry out iterative operation requires only about 106000 gate equivalents' worth of combinatorial circuitry. Note, however, that iterative mode configurations like this tend to achieve such savings in device chip area consumption at significant cost in terms of throughput and performance/algorithmic agility.

Although this invention has been described in connection with specific embodiments and forms thereof, it will be appreciated that various modifications other than those described or mentioned above may be resorted to without departing from the spirit or scope of the invention as defined in the appended claims. For example, functionally equivalent elements may be substituted for those specifically shown and described, certain features may be used independently of other features, and in certain cases, particular locations of elements or particular ordering of method steps or processes may be reversed or interposed, all without departing from the spirit or scope of the invention as defined in the appended claims.

What is claimed is:

1. A universal circuit device configurable, responsive to predetermined configuration data, to selectively establish a plurality of disparate block cipher cryptographic processing circuits, comprising:
   at least one main key processing unit generating a plurality of round keys responsive to the configuration data; and,
   at least one main block processing unit coupled to said at least one main key processing unit, said main block processing unit including:
   block input and output storage units respectively defining predetermined numbers of segments;

a basic data portion forming a plurality of operational channels extending between corresponding segments of said block input and output storage units, said basic data portion including:
  a nonlinear map (F) stage disposed in at least a first of said operational channels, said F stage having a bypass stage coupled in parallel thereto, said F stage and said bypass stage being selectively coupled in a mutually exclusive manner, responsive to the configuration data, to pass output data along said first of said operational channels, said F stage executing a preselected nonlinear conversion on input data received from a segment of said block input storage unit;
  a linear map (L) stage operably coupled, responsive to the configuration data, to linearly transfer input data received from one selected segment of said block input storage unit to one or more selected operational channels; and,
  a round key (K) stage disposed in at least a second of said operational channels, said K stage applying to data in said second of said operational channels one of the round keys generated by said main key processing unit;
  wherein data processed through each of said operational channels is stored in a corresponding segment of said block output storage unit.

2. The universal circuit device as recited in claim 1, wherein said F stage of said basic data portion is alternatively coupled to apply the output data thereof to said second operational channel when said first operational channel is disposed in a bypass configuration with said bypass stage operably coupled to pass the output data thereof along said first operational channel.

3. The universal circuit device as recited in claim 2, wherein;
  said K stage of said basic data portion executes to bitwise add to data in said second operational channel one of the round keys and a multi-bit constant established responsive to the configuration data; and,
  said F stage in the bypass configuration of said first operation channel executes to bitwise add the output data thereof to data in said second operational channel downstream of said K stage.

4. The universal circuit device as recited in claim 3, wherein said L stage includes a plurality of exclusive-OR (XOR) sub-stages coupled to bitwise add together data from different combinations of segments of said block input storage unit responsive to the configuration data.

5. The universal circuit device as recited in claim 4, wherein said L stage of said basic data portion when operably coupled to linearly transfer data to said second operational channel executes to bitwise add to the data in said second operational channel upstream of said K stage.

6. The universal circuit device as recited in claim 1, wherein said F stage includes a plurality of look up tables each selectively defined responsive to the configuration data for collectively applying the preselected nonlinear conversion on a segment of data in said first operational channel.

7. The universal circuit device as recited in claim 1, wherein said main block processing unit further includes a permutation stage selectively established responsive to the configuration data to execute a byte permutation on a block of payload data for predetermined bytewise reordering of payload data within the block.

8. The universal circuit device as recited in claim 7, wherein:
  said main key processing unit generates a plurality of round pre-keys responsive to the configuration data; and,
  said main block processing unit further includes a pre-add stage executing to bitwise add corresponding round pre-keys and multi-bit pre-constants to respective groupings of permuted bytes of payload data for storage in a segment of said block input storage unit, each corresponding round pre-key being generated by said main key processing unit, each corresponding multi-bit pre-constant being established responsive to the configuration data.

9. The universal circuit device as recited in claim 8, wherein said basic data portion of said main block processing unit further includes a segment-wise linear map stage executing to linearly transfer data between selected segments of said block output storage unit in predetermined manner responsive to the configuration data.

10. The universal circuit device as recited in claim 9, wherein said basic data portion is configured for iterative execution over a predetermined number of consecutive iterations, data stored in said block output storage unit during one iteration being transferred to said block input storage unit for the next iteration.

11. The universal circuit device as recited in claim 9, wherein:
  said main key processing unit generates a plurality of round post-keys responsive to the configuration data; and,
  said main block processing unit further includes a post-add stage executing to bitwise add corresponding round post-keys and multi-bit post-constants to respective segments of data in said block output storage unit, each corresponding round post-key being generated by said main key processing unit, each corresponding multi-bit post-constant being established responsive to the configuration data.

12. The universal circuit device as recited in claim 8, wherein said main key processing unit generates the round keys responsive to the configuration data based on a preselected cryptovariable, and said main key processing unit includes:
  key input and key output storage units respectively defining predetermined numbers of segments, said key input storage unit being loaded with key data retrieved from the preselected cryptovariable;
  a key pre-add stage executing to generate the round pre-keys responsive to the configuration data based on key data retrieved alternatively from the preselected cryptovariable or from a pre-key register unit fixed in predetermined content;
  a basic key portion forming a plurality of update channels extending between corresponding segments of said key input and key output storage units, said basic key portion including:
    a round key generation stage selectively generating each round key from a segment of the key data responsive to the configuration data;
    a nonlinear key update stage operably coupled to at least a first of said update channels, said nonlinear key update stage being selectively coupled responsive to the configuration data to execute a preselected nonlinear conversion on key data in said first update channel for application to a second of said update channels; and,
    a linear key update stage operably coupled responsive to the configuration data to one or more selected update channels, said linear key update stage executing a preselected linear conversion on key data in a selected update channel for application to another update channel;

wherein key data processed through each of said update channels is stored in a corresponding segment of said key output storage unit.

13. The universal circuit device as recited in claim 12, wherein said basic key portion of said main key processing unit further includes a segment-wise linear key map stage executing to linearly transfer key data between selected segments of said key output storage unit in predetermined manner responsive to the configuration data.

14. The universal circuit device as recited in claim 1, wherein said main key processing unit generates the round keys responsive to the configuration data based on a preselected cryptovariable, and said main key processing unit includes:

key input and key output storage units respectively defining predetermined numbers of segments, said key input storage unit being loaded with key data retrieved from the preselected cryptovariable;

a basic key portion forming a plurality of update channels extending between corresponding segments of said key input and key output storage units, said basic key portion including:

a round key generation stage selectively generating each round key from a segment of the key data responsive to the configuration data;

a nonlinear key update stage operably coupled to at least a first of said update channels, said nonlinear key update stage being selectively coupled responsive to the configuration data to execute a preselected nonlinear conversion on key data in said first update channel for application to a second of said update channels; and, a linear key update stage operably coupled responsive to the configuration data to one or more selected update channels, said linear key update stage executing a preselected linear conversion on key data in a selected update channel for application to another update channel;

wherein key data processed through each of said update channels is stored in a corresponding segment of said key output storage unit.

15. The universal circuit device as recited in claim 14, wherein said basic key portion is configured for iterative execution over a predetermined number of consecutive iterations, data stored in said key output storage unit during one iteration being transferred to said key input storage unit for the next iteration.

16. The universal circuit device as recited in claim 1, wherein:

said main key and main block processing units are configured to execute block cipher cryptographic processing based on a block size of 128 bits or 256 bits; and, a plurality of main key and main block processing units are operably coupled to concurrently execute on different data blocks in pipelined manner.

17. A universal circuit device selectively configurable to establish and interconnect hardware elements thereof, responsive to predetermined configuration data, to execute a plurality of types of block cipher cryptographic processing with space efficient configurational agility, comprising:

at least one main key processing unit generating, responsive to the configuration data, a plurality of round keys and a plurality of round pre-keys, the round keys being generated based on a preselected cryptovariable; and, at least one main block processing unit coupled to said at least one main key processing unit and defined by a partial preconfiguration of the hardware elements, said main block processing unit including:

block input and output storage units respectively defining predetermined numbers of segments;

a basic data portion forming a plurality of operational channels extending between corresponding segments of said block input and output storage units, said basic data portion including:

a nonlinear map (F) stage disposed in at least a first of said operational channels, said F stage having a bypass stage coupled in parallel thereto, said F stage and said bypass stage being selectively coupled in a mutually exclusive manner, responsive to the configuration data, to pass output data along said first of said operational channels, said F stage executing a preselected nonlinear conversion on input data received from a segment of said block input storage unit;

a linear map (L) stage operably coupled, responsive to the configuration data, to linearly transfer input data received from one selected segment of said block input storage unit for bitwise addition at one or more selected operational channels; and, a round key (K) stage disposed in at least a second of said operational channels, said K stage bitwise adding to data in said second of said operational channels one of the round keys generated by said main key processing unit;

wherein data processed through each of said operational channels is stored in a corresponding segment of said block output storage unit.

18. The universal circuit device as recited in claim 17, wherein said basic data portion of said main block processing unit further includes a permutation stage selectively established responsive to the configuration data to execute a byte permutation on a block of payload data for predetermined bytewise reordering of payload data within the block.

19. The universal circuit device as recited in claim 17, wherein:

said main block and main key processing units are configured for block cipher cryptographic processing of symmetric-key type to encrypt and decrypt payload data based on the same round keys;

said main key processing unit generates a plurality of round pre-keys responsive to the configuration data; and, said main block processing unit further includes a pre-add stage executing to bitwise add corresponding round pre-keys and multi-bit pre-constants to respective groupings of permuted bytes of payload data for storage in a segment of said block input storage unit, each corresponding round pre-key being generated by said main key processing unit, each corresponding multi-bit pre-constant being established responsive to the configuration data.

20. A universal circuit device selectively configurable, responsive to predetermined configuration data, to execute a plurality of types of block cipher cryptographic processing with space efficient structure and configurational agility, comprising:

at least one main key processing unit generating, responsive to the configuration data, a plurality of round keys from a main key; and, at least one main block processing unit coupled to said at least one main key processing unit, said main block processing unit including:
- an intermediate input storage unit defining a predetermined number of segments;
- an intermediate output storage unit defining a predetermined number of segments; and,
- a basic data portion forming a plurality of operational channels extending between corresponding segments of said intermediate input and said intermediate output storage units, said basic data portion including:
  - a nonlinear map (F) stage disposed in at least a first of said operational channels, said F stage having a bypass stage coupled in parallel thereto, said F stage and said bypass stage being selectively coupled in a mutually exclusive manner, responsive to the configuration data, to pass output data along said first of said operational channels, said F stage executing a preselected nonlinear conversion on input data received from a segment of said intermediate input storage unit;
  - a linear map (L) stage operably coupled, responsive to the configuration data, to linearly transfer input data received from one selected segment of said intermediate input storage unit for bitwise addition at one or more selected operational channels; and,
- a round key (K) stage disposed in at least a second of said operational channels, said round key stage bitwise adding to input data received thereby one of the round keys generated by said main key processing unit;
- wherein data processed through each of said operational channels is stored in a corresponding segment of said intermediate output storage unit.

* * * * *